Dec. 16, 1947.   C. ANDERSON   2,432,851
LAWN MOWER GRINDER
Filed Oct. 2, 1945   3 Sheets-Sheet 1
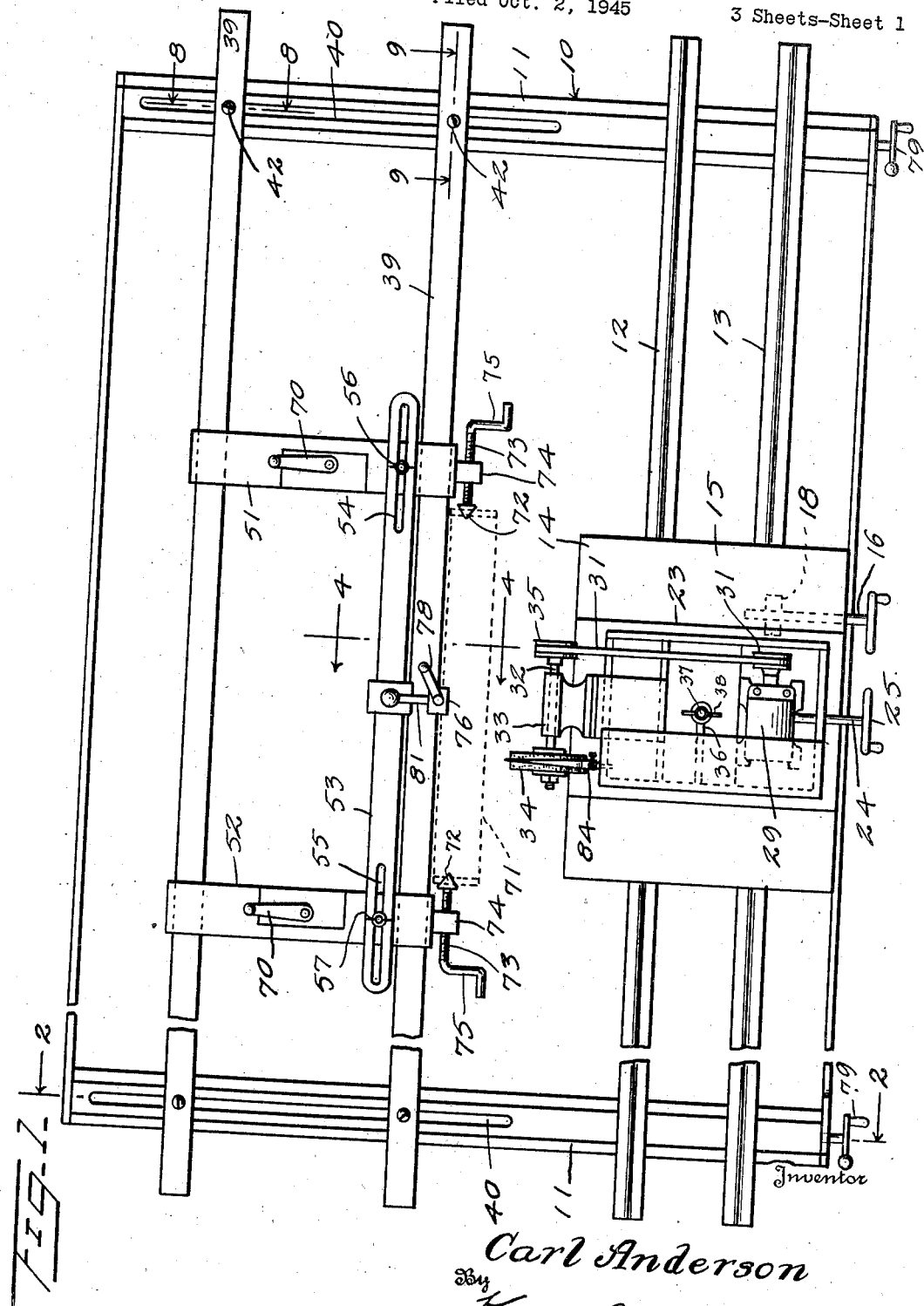
Inventor
Carl Anderson
By Kimmel & Crowell Attorneys Dec. 16, 1947.  C. ANDERSON  2,432,851
LAWN MOWER GRINDER
Filed Oct. 2, 1945  3 Sheets-Sheet 2
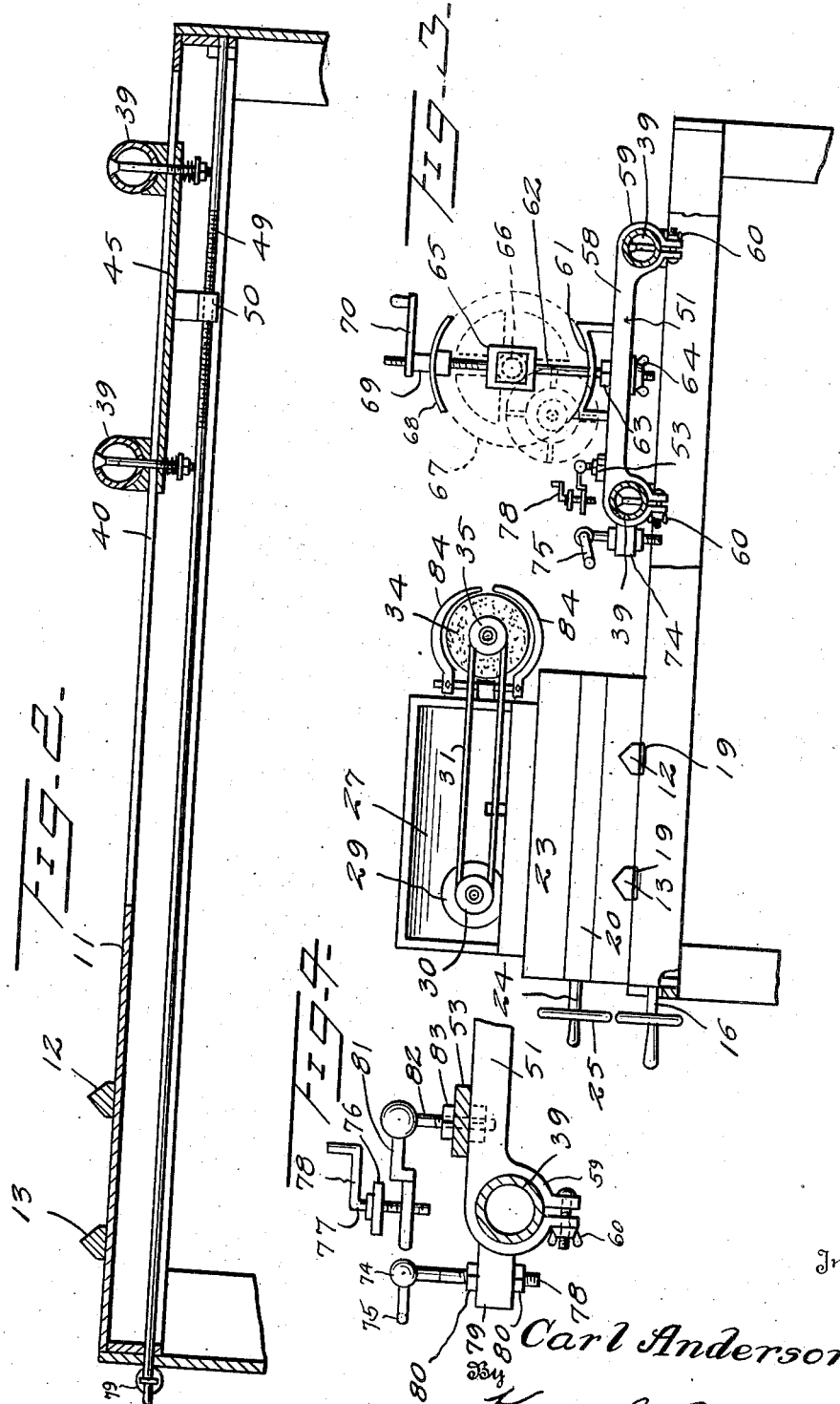
Inventor
Carl Anderson
By Kimmel & Crowell Attorneys Dec. 16, 1947.  C. ANDERSON  2,432,851
LAWN MOWER GRINDER
Filed Oct. 2, 1945  3 Sheets-Sheet 3
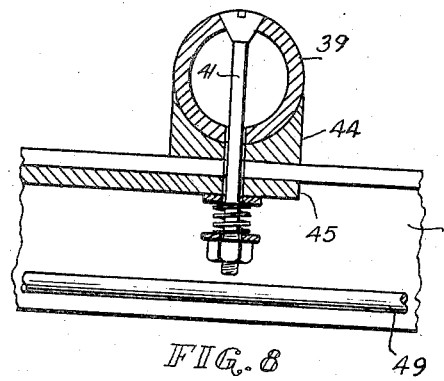
FIG. 8
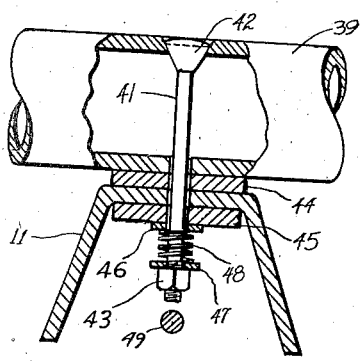
FIG. 9
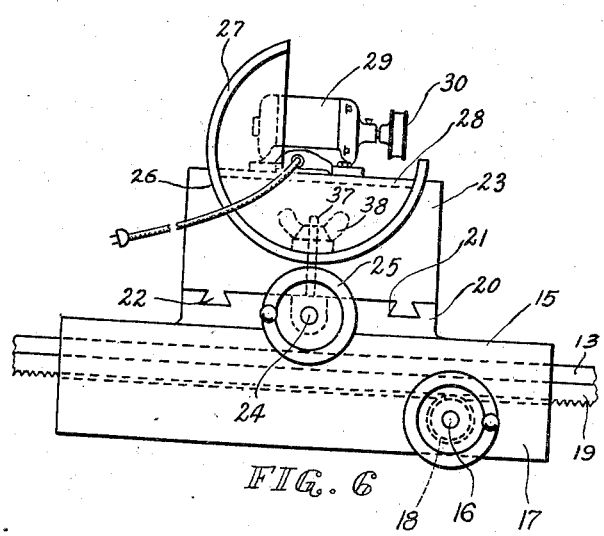
FIG. 6
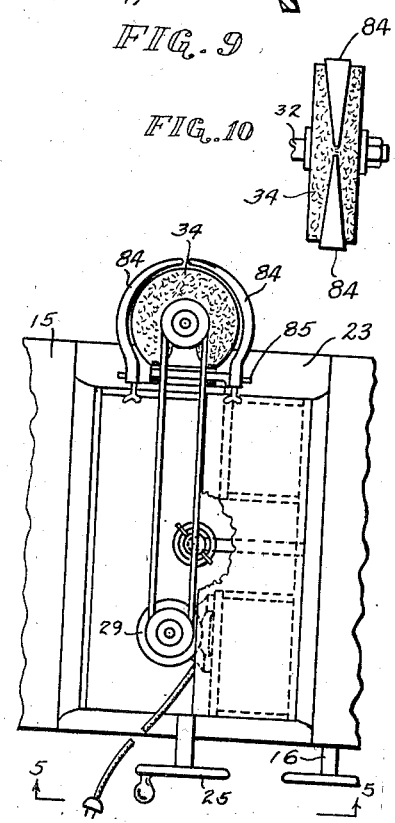
FIG. 7
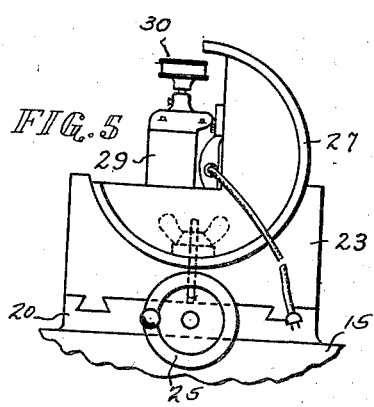
FIG. 5
FIG. 10
INVENTOR.
CARL ANDERSON
BY
Kimmel & Crowell
Attys.

Patented Dec. 16, 1947

2,432,851

UNITED STATES PATENT OFFICE 2,432,851

LAWN MOWER GRINDER

Carl Anderson, Erskine, Minn.

Application October 2, 1945, Serial No. 619,860

6 Claims. (Cl. 51—48)

This invention relates to lawn mower sharpening machines.

An object of this invention is to provide a machine by which the rotary and stationary blades of a lawn mower may be sharpened.

Another object of this invention is to provide a machine of this kind which will sharpen lawn mowers of different sizes.

A further object of this invention is to provide a machine of this kind which includes a frame or bed provided with means for clamping the mower, and also provided with a movable carriage on which a motor operated grinder is mounted, the carriage including means whereby the motor and grinder may be angularly adjusted so as to present the desired grinding surface to the blade.

With the foregoing objects in view, and others which may hereinafter more fully appear, the invention consists of the novel construction, combination and arrangement of parts, as will be more specifically described and illustrated in the accompanying drawings wherein are shown embodiments of the invention, but it is to be understood that changes, variations, and modifications may be resorted to which fall within the scope of the invention as claimed.

In the drawings:

Figure 1 is a plan view partly broken away of a lawn mower sharpener constructed according to an embodiment of this invention, Figure 2 is a sectional view taken on the line 2—2 of Figure 1, Figure 3 is a detail side elevational view of the device, partly broken away and in section, Figure 4 is a sectional view taken on the line 4—4 of Figure 1, Figure 5 is a view taken substantially on the line 5—5 of Figure 7, Figure 6 is a view taken on the line 6—6 of Figure 1, Figure 7 is a plan view, partly broken away, of the motor carriage, Figure 8 is a sectional view taken on line 8—8 of Figure 1, Figure 9 is a sectional view taken on the line 9—9 of Figure 1, and Figure 10 is a fragmentary front elevation of the grinding wheel and reel guide.

Referring to the drawing the numeral 10 designates generally a frame which comprises a pair of channel-shaped longitudinal bars 11, which are connected together adjacent the rear ends thereof, by means of a pair of inverted V-shaped track members 12 and 13. The inverted V-shaped track members 12 and 13 are fixed as by welding or the like to the upper sides of the longitudinal members 11 so as to thereby provide V-shaped tracks. The tracks 12 and 13 have slidably mounted thereon a carriage, generally designated as 14. The carriage 14 includes a lower body 15 which is movable lengthwise of the tracks 12 and 13 upon rotation of a gear shaft 16 which is journalled through an apron or front wall 17 of the body 15.

The shaft 16 has secured thereto a gear 18 which meshes with an elongated rack 19 which is fixed relative to the rear track 13. The body 15 has extending from the upper side thereof an auxiliary body 20 which is formed with a pair of keyways 21 within which keys 22, carried by the lower side of an auxiliary carriage 23, are adapted to slidably engage.

The carriage 23 is movable lengthwise of the guideways 21 by means of a screw shaft 24 engaging a dependent nut 25 carried by the carriage 23. The carriage 23 is formed with a longitudinally extending transversely arcuate saddle 26 within which an arcuate motor support 27 is adapted to adjustably engage. The motor support 27 includes a table 28 on which a motor 29 is secured and the motor 29 has a pulley 30 secured to the shaft thereof, about which a belt 31 engages. A grinding wheel shaft 32 is journalled in the bearing 33 secured to the forward portion of the motor mounting member 27, and a grinding wheel or abrader 34 is secured to the shaft 32. A pulley 35 is secured to the shaft 32 and the belt 31 is trained thereabout. Abrading wheel 34 may be disposed with the axis thereof either horizontal or vertical through the medium of an elongated slot 36 which is formed in the arcuate cradle 27 and through which a screw 37 loosely engages. A thumb nut 38 is threaded onto the screw 37 so that the mounting 27 may be adjusted to position the axis of the grinding wheel 34 either vertical or horizontal or at any other desired angle.

The longitudinal frame members 11 have mounted thereon a pair of parallel guide bars 39 which are secured to the longitudinal members 11, in adjusted position relative to each other and to the track members 12 and 13 by means of an elongated slot 40 which is formed in each longitudinal member 11. A bolt 41 is extended through the guide member 39, being formed with a tapered head 42, which is countersunk in the upper side of the guide member 39, and the bolt 41 is then extended through the slot 40 and has a nut 43 threaded on the lower end thereof.

A washer 44 is interposed between the lower side of the guide 39 and an elongated bar 45 is disposed on the lower side of the longitudinal member 11, and interposed between the spring washer 46 and the lower side of the frame member 11. A second washer 47 is interposed between the lower end of a bolt tensioning spring 48 which engages about the bolt 41. The bar 45 connects the bolts of the two guide members together so that these guide members may be moved as a unit upon rotation of a screw shaft 49 which is journalled lengthwise of the frame member 11. The screw shaft 49 is threaded through a nut 50 fixed to and extending downwardly from the connecting bar 45.

A mower supporting carriage, comprising slide members 51 and 52 engages the guide members 39, and the slide members 51 and 52 are connected together by means of an elongated connecting bar 53 which is formed of a pair of elongated slots 54 and 55 adjacent the ends thereof through which thumb screws 56 and 57 engage.

The slide members 51 and 52 are of like construction and are shown more clearly in Figure 3 and each includes an elongated bar 58 which is formed with a pair of split rings 59 at the opposite ends thereof forming clamping rings which are tightened about the guide members 39 by clamp bolts 60.

The mower is firmly clamped on the carriage formed by the bars 51 and 52 by means of a clamping structure which includes a lower arcuate stationary jaw 61 fixed to the upper side of each slide bar 51 and 52.

A vertically disposed threaded shaft 62 is extended through the central portions of the slide bar 51 being locked in vertically adjusted position by means of a lock nut 63 and a thumb nut 64. The shaft 62 includes a rectangular frame 65 which is disposed in a position for receiving the stationary stub shaft 66 which is carried by the side frame 67 of the mower.

The upper downwardly urged clamping member 68 slidably engages on the shaft 62, and is clamped against the upper side of the side members 67 of the mower by means of a nut 69 threaded on the shaft 62 and which has a crank 70 secured thereto.

In order to provide a means whereby the stationary cutter blade 71 of the mower may be sharpened when the stationary blade is removed from the mower frame I have provided a pair of confronting cone-shaped clamping members 72 which are carried by threaded shaft 73 engaging through vertically adjustable nuts 74 which are fixed to the upper ends of threaded rods 78 loosely engaging through lugs 79 carried by carriage bars 51 and 52 and locked in vertically adjusted position by nuts 80.

The center points 72 engage in center openings which are usually formed in the stud shafts carried by the stationary blades 71, and each screw shaft 73 has a crank 75 secured thereto. The rear or back side of the blade 71 is clamped by means of a substantially U-shaped clamp 76 which is carried by a supporting bar 81. A threaded shaft 77 engages through the upper jaw of the clamp 76 and is threaded into the lower jaw. A crank or handle 78 is secured to the draft 77 so that this shaft may be readily rotated either to clamping or released position. The supporting bar is angularly carried by the upper end of a vertically adjusted threaded rod 82 engaging through bar 53 and locked in adjusted position by nuts 83.

In the use and operation of this device the motor 29 is connected to a source of electric power and the lawn mower has the wheels removed therefrom, and the handle disengaged from the frame so that the end plates of the mower may be clamped between the clamping jaws 61 and 68. The rotary blade or reel is then engaged by the abrading wheel 37, which may be disposed in the position shown in Figure 1. The blade being ground is disposed between the confronting ends of a pair of arcuate guide arms 84 which are adjustably carried by a rod 85 which is fixed relative to the cradle 27.

The guide members 39 are adjusted toward or away from the abrading wheel 39 by rotation of the screw shafts 49 which have hand wheels 79 secured to the rear ends thereof.

In the event it is desired to grind the upper surface of the stationary blade 71, this blade may be removed from the mower frame, and clamped between the points 72 with the back of the blade 71 clamped between the clamp 76.

The abrading wheel 34 may be turned with the motor 29 to position the axis thereof vertically so that the flat side of the abrader will engage the upper surface of the blade 71.

What I claim is:

1. A lawn mower sharpener comprising a bed formed of a pair of elongated channel members, a pair of guide rails secured between said channel members, a carriage movable on said rails, a saddle carried by said carriage having a horizontally disposed concave upper side, a cradle on said saddle, a motor on said cradle, an abrading wheel on said cradle connected to said motor, means for adjusting said cradle on said saddle whereby to vary the cutting angle of said abrading wheel, means supporting the mower in a position for contact with the abrading wheel.

2. A lawn mower sharpener, as set forth in claim 1, wherein said supporting means includes a carriage movably mounted on said channel members, and means adjusting the position of said latter carriage relative to said first carriage.

3. A lawn mower sharpener as set forth in claim 1, including a pair of arcuate guide arms carried by said cradle and engaging about said abrading wheel and having their free ends spaced apart for slidably receiving therebetween a reel blade.

4. A lawn mower sharpener comprising a bed formed of longitudinal channel members, a pair of transverse guide rails fixed to said members, a main carriage slidable on said rails, a second carriage slidably carried by said main carriage, an abrading member rotatably carried by said second carriage, a mower supporting carriage adjustably carried by said channel members, means adjusting said mower carriage toward or from said second carriage, and means securing a mower on said mower carriage, said second carriage including an arcuate saddle having a horizontally disposed concave upper side, a cradle in said saddle, means supporting said abrading member on said cradle, a power member on said cradle connected to said abrading member, and means rotatably adjusting the position of said cradle to thereby vary the angular position of said abrading member.

5. A lawn mower sharpener comprising a bed formed of longitudinal channel members, a pair of transverse guide rails fixed to said members, a main carriage slidable on said rails, a second carriage slidably carried by said main carriage, an abrading member rotatably carried by said second carriage, a mower supporting carriage adjustably carried by said channel members, means adjusting said mower carriage toward or from said second carriage, and means securing a mower on said mower carriage, said mower carriage including a pair of parallel elongated guide bars, means disposed within the channels of said members connecting said guide bars together, a nut carried by said connecting means, and a screw shaft threaded through said nut and rotatably disposed in a channel member for effecting adjustment of said mower carriage.

6. A lawn mower sharpener comprising a bed formed of a pair of horizontally disposed parallel channel members, a pair of horizontally disposed parallel guide rails fixed between said channel members, a main carriage slidable on said rails, means adjusting said main carriage along said rails, a second carriage slidable on said main carriage in a direction parallel to said channel members, an abrading member, means for rotating said abrading member, a common supporting means for said abrading member and said rotating means, means mounting said supporting means on said second carriage whereby said supporting means may be rotatably adjusted about a horizontal axis parallel to said channel members, a mower carriage disposed in confronting position to said main carriage, and means supporting said mower carriage between said channel members.

CARL ANDERSON.

REFERENCES CITED

The following references are of record in the file of this patent:

UNITED STATES PATENTS

| Number | Name | Date |
|---|---|---|
| 850,374 | King | Apr. 16, 1907 |
| 1,344,168 | Brown | June 22, 1920 |
| 1,836,482 | Lyon et al. | Dec. 15, 1931 |
| 1,967,964 | Miller | July 24, 1934 |
| 2,180,911 | Rogers | Nov. 21, 1939 |
| 2,377,126 | Brown | May 29, 1945 |